March 24, 1970  J. D. SCHMUNK  3,502,356

PLAIN END SEWER PIPES AND COUPLING FOR SAME

Filed Nov. 2, 1967  2 Sheets-Sheet 1

*INVENTOR.*
JOHN D. SCHMUNK
BY
HIS ATTORNEY

United States Patent Office 3,502,356
Patented Mar. 24, 1970

3,502,356
PLAIN END SEWER PIPES AND COUPLING
FOR SAME
John D. Schmunk, Findlay, Ohio, assignor to The
Hancock Brick and Tile Company, Findlay, Ohio,
a corporation of Ohio
Filed Nov. 2, 1967, Ser. No. 680,078
Int. Cl. F16l 49/00
U.S. Cl. 285—230          5 Claims

ABSTRACT OF THE DISCLOSURE

Ceramic plain end sewer having varying diameters, circumferences and degrees of roundness are provided adjacent each end with an external annular groove, which is of constant depth in relation to the outer surface of the pipe regardless of the out-of-roundness of the pipe. The cross section of the groove is constant for all pipes. The circumference root of all grooves is made constant by means of a plastic filler. The root diameter of the plastic-containing grooves varies with the diameter of the pipe and such grooves with the filler finish at a uniform depth around the pipe. O-rings of elastomeric material of uniform circumference and cross section fit the grooves and the adjacent pipe ends are forced into a flexible coupling sleeve, which conforms to out-of-roundness regardless of where it occurs in the adjacent pipe ends, so that the space between the pipes and the sleeve is uniform and is occupied by the O-rings, which are equally and uniformly compressed around the pipes to effect liquid-tight seals.

SUMMARY

Difficulty is encountered in producing a liquid tight coupling for the adjacent ends of plain end ceramic pipes, such as sewer pipes, because of their lack of uniformity. After being dried from their plastic condition, there is considerable irregularity in their diameters and circumferences, although in their plastic state they were uniform. It is a desideratum to provide a novel pipe structure, which despite irregularities, can be coupled with similar pipes economically and efficiently.

In accordance with this invention an external circumferential groove is formed in each pipe adjacent the end and, to make its root circumference constant, an amount of plastic fill is introduced sufficient to achieve uniformity so that while conforming to irregularities in diameter, the root circumference of one groove is the same in one pipe as in the other. This makes possible the use of the same O-ring for each groove and a uniform sleeve to contain the two pipe ends for compressing the O-rings for effecting the desired seal. Thus, it is possible to standardize on the O-rings and sleeves for the couplings, and this obviates the necessity of the extra expense of stocking several different sizes to cope with pipe variation.

DESCRIPTION OF PREFERRED EMBODIMENT

Figure 1:
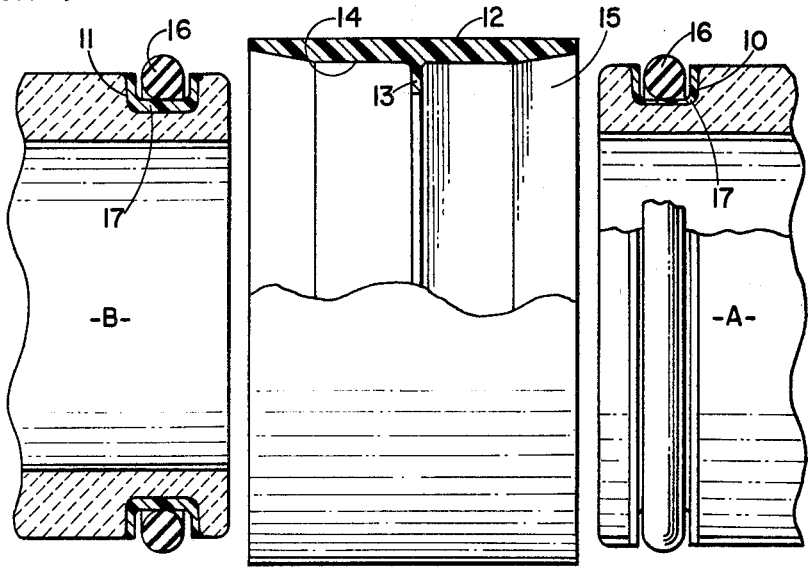
FIGURE 1 is an exploded view partly in elevation and partly in section showing fragments of two plain end ceramic pipes having external O-ring receiving grooves containing a plastic filler and having constant root circumferences, and a coupling sleeve for receiving same.
Figure 2:
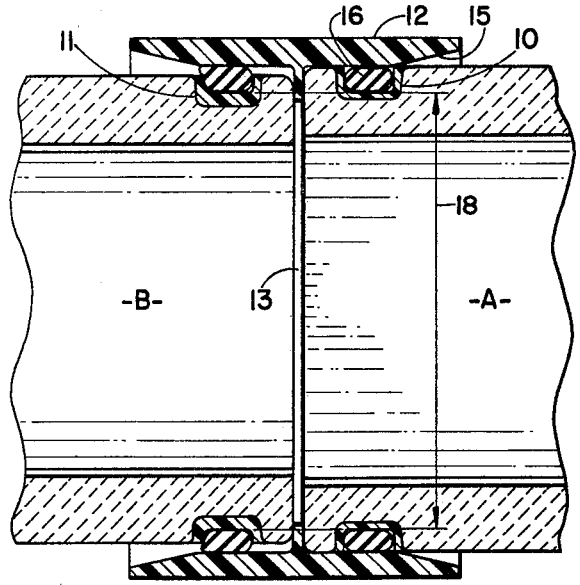
FIGURE 2 is a sectional elevation of the parts shown in FIGURE 1 coupled together.

In the drawings, A and B designate ceramic sewer pipes in which both the inside and outside diameters of pipe A exceed that of pipe B. It is found in practice that although after extrusion these pipes are uniform, they change dimensions during the firing period and the variation may reside in varying degrees of roundness as well as differences in diameter and circumference. These variations militate against the adoption of a standard liquid tight coupling of the usual form to fit the different sizes of pipe.

In this instance, there is formed in each end portion of each ceramic pipe, while in its plastic or semiplastic condition, an external circumferential groove, as indicated at 10, for pipe A and 11, for pipe B. The grooves are shown as being rectangular in cross section, but other shapes may be used. The root circumferences of the grooves 10 and 11 are not the same in the two ceramic pipe ends. The root circumference of the groove 10 is greater than that of groove 11. The depth of the groove 11 is the same as that of groove 10. The depth of either groove is uniform around the pipe even though the adjacent pipes vary in diameter, roundness, and circumference.

Since the root circumference of the two grooves is not the same, manifestly the elastomeric O-rings 16 could not be equally compressed by the sleeve 12 to effect a liquid-tight seal for the pipe ends. Provision is made to cause each of the grooves 10 and 11 to have the same root circumference. For this purpose a plastic filler 17, such as a quick-drying epoxy resin, is introduced, after the pipes are fired, into each groove to which it adheres. It is predetermined, as indicated by arrowed line 18, just what should be the constant circumference for all pipe grooves. Then, by a simple rolling or cutting action, the proper groove is created in this plastic filler. Specifically, this groove root follows the configuration of the pipe in which it is being formed, so that its depth is constant in relation to the pipe outer surface. The forming action is controlled so that the root circumference is exactly as predetermined for all ceramic pipes.

With the field installation of the pipe, it will be understood that the O-rings 16, now inserted in the pipe A and the pipe B and resting in the grooves having identical root circumferences that, by forcing the two pipe ends into a flexible sleeve 12 which may be of semi-rigid polyethylene, the tapered end surfaces 15 gradually compress the O-rings equally until they are disposed in compressed condition in their grooves and against the cylindrical surfaces 14, whereupon an effective liquid-tight seal is secured. As an assembled coupling joint the sleeve 12, being flexible, is equi-distant from the pipe outer wall entirely around both ends of the sleeve even though either or both of the pipes have irregular diameters.

Figure 3:
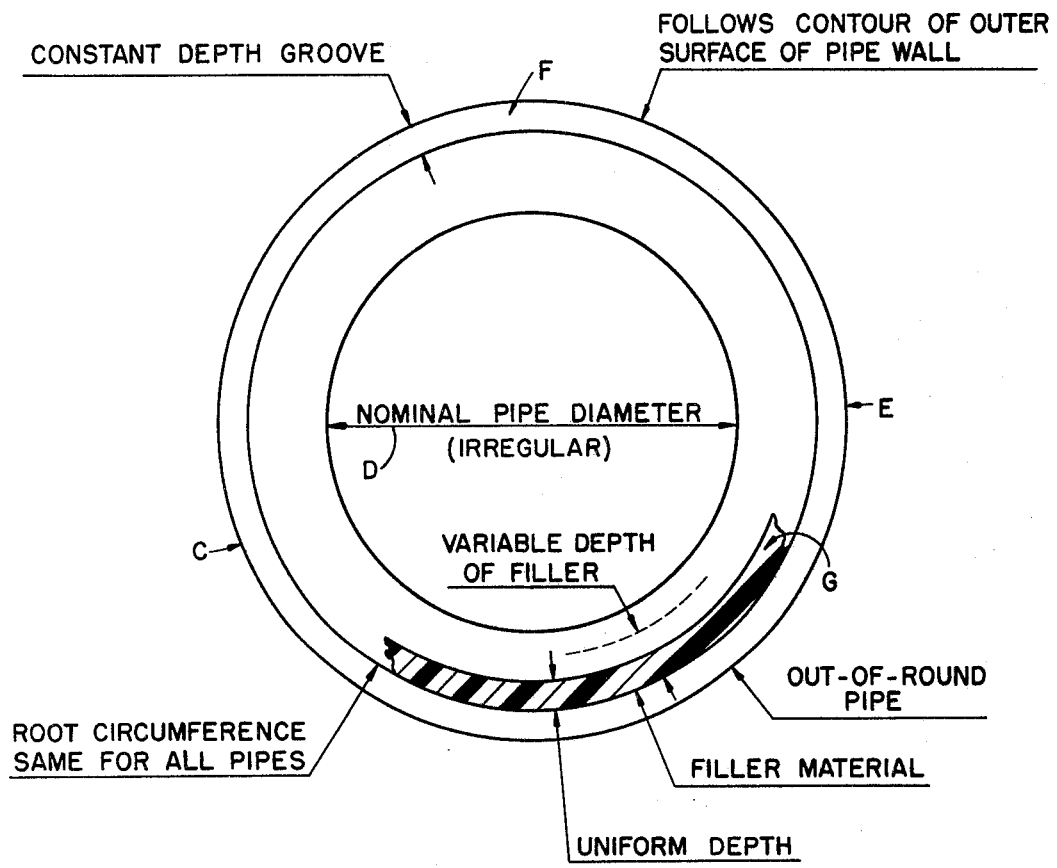
FIGURE 3 is a somewhat schematic transverse sectional view of an end portion of a pipe taken through the external groove and bearing informative legends.

Reference is made to FIGURE 3 for purpose of clarity where C represents a pipe cross section in which the arrowed line D represents the nominal inside diameter, which usually is irregular. E represents the outer surface of the pipe, which is out-of-round and F designates the O-ring receiving groove, which is of constant depth and follows the contour of the outer surface of the pipe wall. Within the groove F is the filler material G, which is of variable depth so as to make the root circumference of the groove F constant for all pipes. In view of this circumstance, the same O-ring may be used for all pipes.

Numerous changes in details of construction and choice of materials may be effected without departing from the spirit of the invention.

What I claim is:
1. A device for coupling ceramic pipes in end to end relation in which adjacent pipes having variable diameters, varying degrees of roundness, and unequal circumferences, said device device comprising an external circular groove adjacent each end of each pipe, filler material disposed completely in each groove of an amount suffi- cient to make the roots of said grooves of constant circumference while said roots will conform to the outer pipe wall shapes, O-rings of elastomeric material of equal size for said grooves respectively, and a constant size semi-rigid plastic sleeve closely fitting the adjacent end portions of both pipes for compressing both O-rings against the inner walls of said sleeve and the walls of said grooves to effect a liquid tight seal in which the annular spaces for O-rings are of uniform cross-section around each pipe end.

2. A coupling device as claimed in claim 1, in which the filler material comprises a quick drying non-metallic plastic material adhered to said grooves.

3. A coupling device as claimed in claim 1, in which the filler material comprises a quick drying epoxy resin.

4. A coupling device as claimed in claim 2, in which the sleeve has a uniform cylindrical internal wall terminating in upwardly tapered end portions enabling gradual compression of the O-rings as the pipes are forced into the sleeve.

5. A device for coupling a pair of aligned plain end pipes in which the pipes having varying diameters, varying degrees of roundness and unequal circumferences, said device comprising an external groove in the end portion of each pipe, each groove being of uniform depth as determined by the contour of the outer surface of the respective pipe wall, filler material disposed completely in each groove of an amount sufficient to make the roots of said grooves of constant circumference, the said groove roots conforming to the shape of the outer wall of the respective pipe, an O-ring of elastomeric material of equal size for each filler-containing groove, and a slightly flexible sleeve fitting the end portions of both pipes for compressing both O-rings into intimate contact with the inner walls of said sleeve and the walls of said grooves regardless of variations in circumference and degrees of out-of-roundness of the respective pipes.

References Cited

UNITED STATES PATENTS

| | | | |
|---|---|---|---|
| 2,234,643 | 3/1941 | Grant | 285—347 X |
| 2,401,554 | 6/1946 | Davids | 285—291 |
| 2,537,659 | 1/1951 | Eisner et al. | 285—230 |
| 3,120,967 | 2/1964 | Kazienko | 285—231 |

FOREIGN PATENTS

| | | |
|---|---|---|
| 257,299 | 9/1967 | Austria. |

THOMAS F. CALLAGHAN, Primary Examiner

U.S. Cl. X.R.

138—109; 277—237; 285—235, 347